March 26, 1963 H. SOLOMON 3,082,537
APPARATUS FOR FACILITATING THE JOINTURE OF CONDUITS
Filed Oct. 12, 1959 4 Sheets-Sheet 1

INVENTOR.
HARVEY SOLOMON
BY
HIS ATTORNEY

March 26, 1963  H. SOLOMON  3,082,537
APPARATUS FOR FACILITATING THE JOINTURE OF CONDUITS
Filed Oct. 12, 1959  4 Sheets-Sheet 2

INVENTOR.
HARVEY SOLOMON
BY
HIS ATTORNEY

March 26, 1963 H. SOLOMON 3,082,537
APPARATUS FOR FACILITATING THE JOINTURE OF CONDUITS
Filed Oct. 12, 1959 4 Sheets-Sheet 3

INVENTOR.
HARVEY SOLOMON
BY
HIS ATTORNEY

March 26, 1963  H. SOLOMON  3,082,537
APPARATUS FOR FACILITATING THE JOINTURE OF CONDUITS
Filed Oct. 12, 1959  4 Sheets-Sheet 4
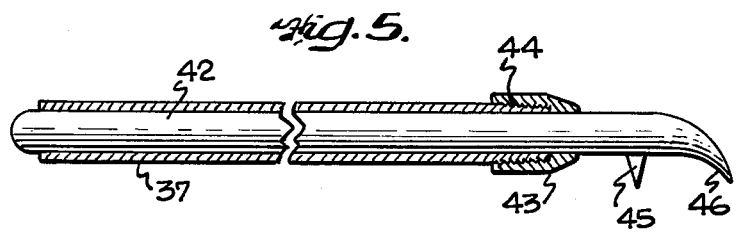
Fig. 5.
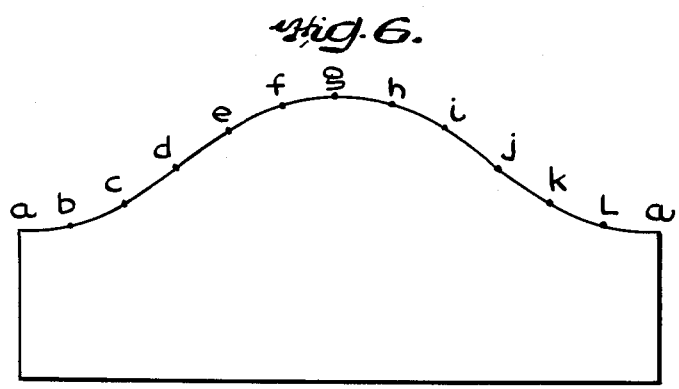
Fig. 6.
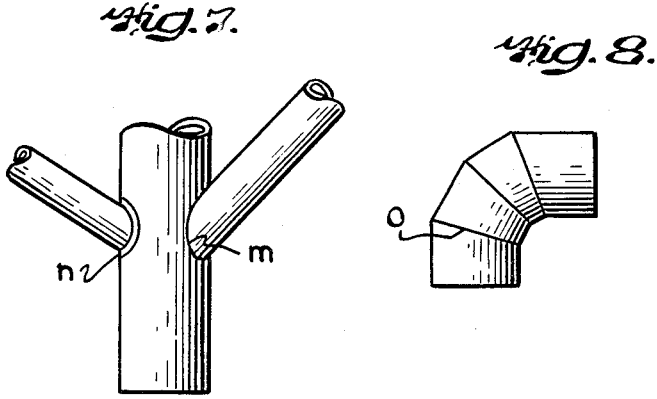
Fig. 7.
Fig. 8.
INVENTOR.
HARVEY SOLOMON
BY
HIS ATTORNEY

United States Patent Office 3,082,537
Patented Mar. 26, 1963

3,082,537
APPARATUS FOR FACILITATING THE JOINTURE OF CONDUITS
Harvey Solomon, Chester, Pa., assignor of one-half to Joseph Teofilak, Maple Gardens, Pa.
Filed Oct. 12, 1959, Ser. No. 845,737
8 Claims. (Cl. 33—174)

My invention is an improved apparatus for facilitating the jointure of conduits by simplifying the determination of the contour required on the end of one pipe or casing to form a close fit between such end and the peripheral surface of a further pipe or casing from which the first pipe branches. My invention may also be utilized to determine the proper shape of the orifice to be cut in the peripheral wall of a main conduit in making an accurate fit of a branch therewith, thereby avoiding obstruction of flow from the branch to the conduit or vice versa. My invention also permits the determination of the proper contours of the ends of a plurality of pipe sections to be abutted end to end to form an elbow of desired bend in any direction or directions.

My invention may be utilized in connection with conduits of different peripheral contours and for outlining either the required shapes of the ends of blanks to be bent to form pipes, or of preformed pipes. It is particularly applicable to the shaping of the edge of a flat sheet or blank which is to be bent into tubular form to provide what is commonly known as a collar used as a connecting section between an end of a branch pipe and the periphery of a main pipe or as a connecting section between the ends of pipe sections disposed at an angle to one another.

In the installation of sheet metal work of heating systems, ventilating systems, conveyor systems and the like, it is frequently necessary to provide collars for jointing together conduit sections, which may branch from one another at a great diversity of angles both vertical and horizontal, and the conduit sections themselves vary widely in relative diameters and shapes. Such jointing operations involve too many variable factors to permit of the satisfactory standardization of collar sections to close the gap between the end of one branch conduit and the periphery of the conduit with which it is to be connected, or between sections to be connected by an elbow. The mathematical or geometrical determination of the contour of the end of the collar section designed to conform with the periphery of the main conduit is tedious, frequently inaccurate and unsatisfactory, particularly where a cylindrical conduit section and a conoidal conduit section are to be joined. So too the determination of the proper shape for the ends of conduit sections to provide elbows in a conduit following a tortuous path is slow, wasteful and expensive.

In accordance with my invention, a series of longitudinally adjustable pattern members or markers are mounted so that they may be arranged relatively to one another about a center in such positions that a cross section taken transversely to their shanks or stems is similar in outline to a cross section taken through one conduit section and the members may be so shifted longitudinally relatively to one another that an outline formed by connecting their ends or marking devices is similar in contour to the peripheral surface or end edge of a conduit section complementary to the first conduit section when disposed at a desired angle relative thereto.

When my invention is used in connection with preformed conduit sections, the arrangement of the pattern-forming members around a center may be attained by positioning them in a suitable mounting in contact with or adjacent to the periphery of an actual conduit section and their longitudinal adjustment may be determined by bringing their heads or contact elements into contact with or adjacent to the peripheral contour or end edge of the complementary conduit section.

When, however, as is most usual, the conduit sections are to be formed from pre-shaped sheets of metal, which are to be bent or rolled to conduit form, means are provided by my invention for generating a phantom contour equivalent to the periphery or end edge of one conduit section or main, and a series of longitudinally movable slides or pins are positioned in suitable mountings in such relation to one another about a center or axis as to lie in a curved path equivalent to the periphery of the other conduit or branch. Such pins are then moved in sequence into contact or juxtaposition to the generating means as it is moved through a path generating the desired phantom contour.

The markers or indicators so adjusted provide indicia points which, when joined by lines, outline the required contour of the edge of the end of the branch conduit and the shape of the complementary opening in the side of the main conduit. The markers or indicators may be used in laying out a pattern on a flat sheet by rolling the group of indicators over such flat sheet so that the indicators sequentially contact with and mark such sheet. Such marking may be done directly upon sheet metal intended to be bent into a conduit section, but is preferably done upon a sheet of paper from which a pattern is then cut for use in laying out and cutting the sheet metal, and the marking may be done directly by a marker or pin carried by the apparatus or may be done at the points indicated by the apparatus by an operative with a suitable instrument.

In the preferred embodiments of my apparatus, a generator of phantom contours, such, for instance, as a straight edge, is so mounted on a base as to be adjustable to generate a wide variety of contours equivalent to the periphery of conduits of many shapes and sizes. This objective may be attained in a simple manner by pivoting a straight edge or generator intermediate its end on a slide movable longitudinally in a fulcrumed member oscillating on a standard slidable vertically and horizontally relatively to a base.

By suitably adjusting the positions of the foregoing parts, the generator or edge may be made to described the outline of any desired conduit section either by rocking the slide on its fulcrum or by moving vertically the axis of the fulcrum.

The markers or indicators coacting with the surface generating member may be mounted in tubes or sleeve-like bearings arranged about a center line and movable toward and from such center line by suitable screw and nut mechanism. The tubes are preferably mounted on a fulcrumed carrier, which is vertically adjustable by means of telescoping post sections, one of which is rotatable relatively to the other, the latter being mounted on a slide on the base.

By adjusting the tubes to the proper positions about the center line, the markers or indicators may be positioned in a curved path conforming with the cross sectional contour of a branch pipe, and, by coordinating the markers and generator member, the markers are so positioned longitudinally as to define the requisite contour for an end edge of the branch pipe which is to connect with the main pipe.

When it is desired merely to form a conduit section suitable for the formation of an elbow, the oscillatory generator may be fixed against oscillation and reciprocated vertically or a flat plate may be substituted for the generator member since in forming elbow sections all the points of the abutting edges of the pipes lie in or are parallel to a common plane.

The characteristic features of my invention will further appear from the following description and the accompanying drawings in illustration thereof.

In the drawings:

FIG. 5 is an enlarged broken longitudinal sectional view of one of the longitudinally movable markers or indicators and of the tubular housing therefor;

FIG. 6 is a plan view of a pattern outlined by moving an adjusted set of indicators or markers over a sheet of suitable material;

FIG. 7 is a diagrammatic view of a main having branch pipes united thereto in accordance with my invention; and FIG. 8 is a diagrammatic view of an elbow formed of collar sections made from sheets outlined in accordance with my invention.

Figure 1:
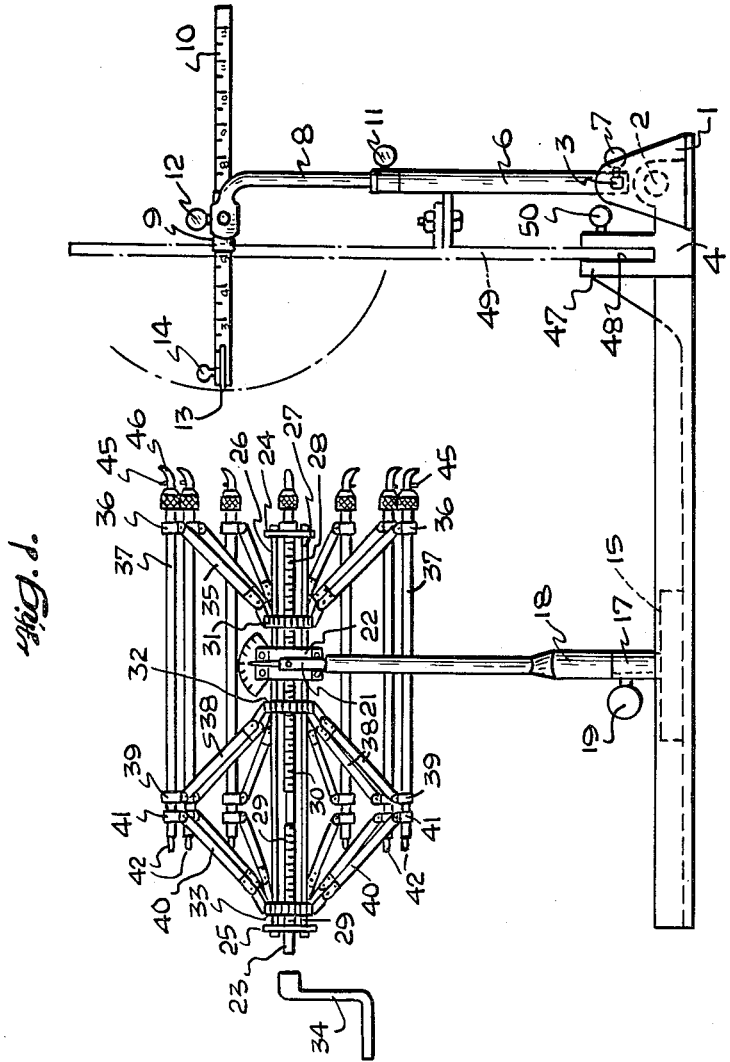
FIG. 1 is a side elevation of a form of apparatus embodying my invention.
Figure 2:
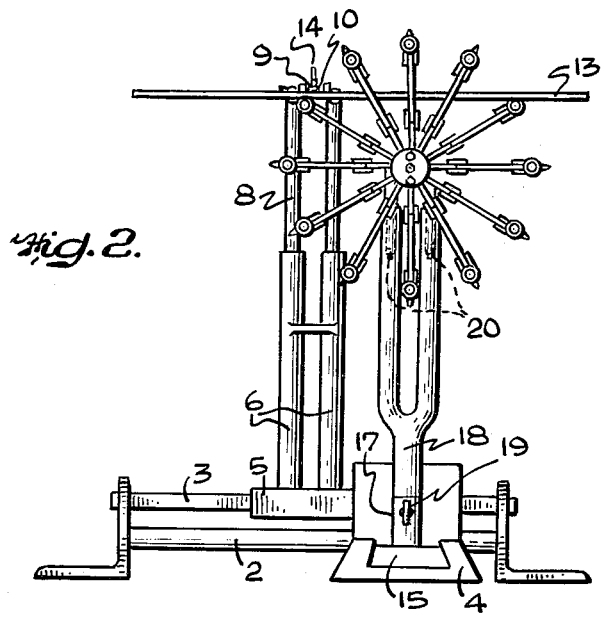
FIG. 2 is an end elevation of the apparatus looking from the left hand end of FIG. 1.
Figure 3:
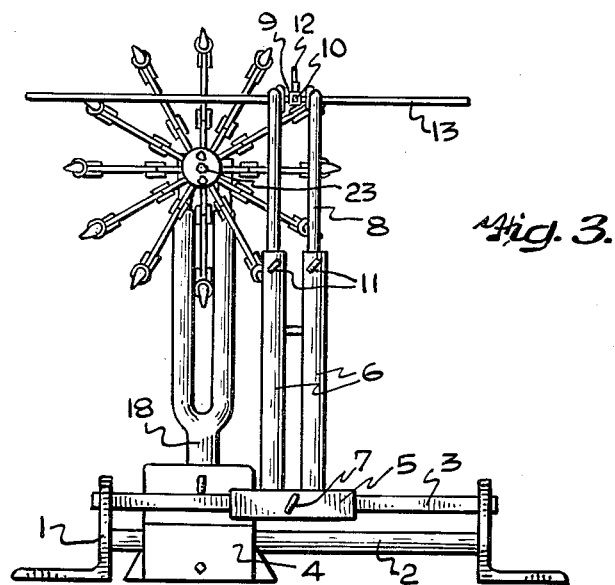
FIG. 3 is an end elevation of the device shown in FIG. 1 looking from the right hand end of FIG. 1.
Figure 4:
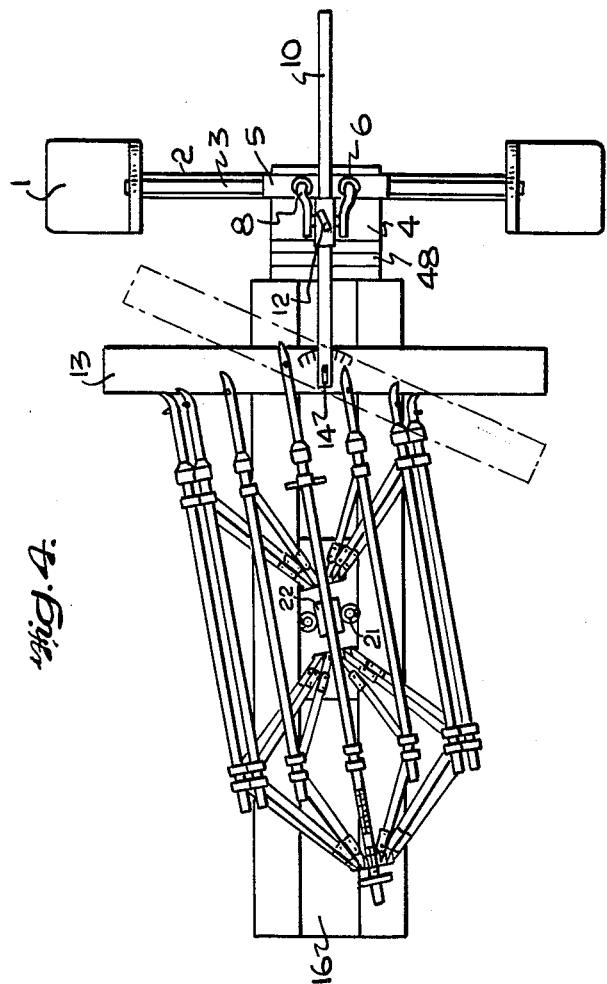
FIG. 4 is a top plan view with the indicators disposed at an angle to the positions in which they are shown in FIGS. 1 to 3, and with the adjustability of the contour generating member indicated by dotted lines.

As illustrated in the drawings, end base members 1 are connected by the cylindrical rod 2 and the rectangular rod 3 forming slideways respectively for a base member 4 and for a bottom bearing 5 of pillars 6. The slide 5 may be fixed in desired position on the slideway 3 by means of a wing nut 7.

Curved arms 8 are telescopically connected with the hollow upright pillars 6 and form a bearing in which are journalled trunnions of a housing 9 providing a slideway for a rod 10 having thereon a suitable measuring scale complementary to a datum mark on the housing. The relative positions of the members 6, 8 and 10 may be fixed by means of the thumb screws 11 and 12.

A cross bar 13 is pivotally connected with the cleft front end of the rod 10 and may be fixed in desired position by means of a thumb screw 14. The bar 13 is preferably provided with a scale of degrees cooperating with a datum mark on the rod 10 for indicating the relative angularity of the rods 10 and 13. The forward edge of the bar 13 is preferably a straight edge, but rods may be provided having an edge of such shape as will conform with the longitudinal cross section of a conduit surface when corrugated or irregular pipes are to be joined.

By properly positioning the slide rod 10 in the housing 9, any desired radius between the axis of the trunnions and the edge of the straight edge 13 may be secured, and when the housing 9 is oscillated about the axis of the trunnions, the edge of the bar 13 will move through a path coincident with the surface of a length of conduit having an axis coincident with the axis of the trunnions and a radius equal to the distance between the axis of the trunnions and the edge of the member 13.

A slide 15 is movable along the slideway 16 in the base 4 toward and from the rod 2, and a hub 17, projecting upwardly from this slide 15, has journalled therein a bifurcated shaft 18 provided with a scale of degrees complementary to a datum mark on the hub 17. The shaft 18 is vertically and rotatably adjustable in the hub 17 and may be secured in desired position by a thumb screw 19.

The upper ends of the bifurcated shaft 18 contain sockets 20 for the reception of pins 21 to which are pivoted a head 22 having fixed thereto a scale of degrees coacting with a pointer or datum mark on one of the pins. The head 22 has journalled therein a shaft 23 having its ends journalled in plates 24 and 25 carried by rods 26 and 27 mounted in the head 22.

The end sections 28 and 29 of the shaft 23 are threaded in the same direction, oppositely to the pitch of the thread on the intermediate shaft section 30.

Nuts 31, 32 and 33 are threaded on the shaft 23 and held against rotation by the rods 26 and 27 so that the rotation of the shaft 23 in one direction by means of the detachable handle 34 causes the nuts 31 and 32 to approach the head 22, and the nut 33 to recede therefrom, while the rotation of the shaft in the opposite direction will cause the nut 33 to approach the head 22 and the nuts 31 and 32 to recede therefrom.

The nut 31 is pivotally connected by links 35 with mountings 36 fixed adjacent to the ends of the tubes or sleeve-bearings 37. The nut 32 is pivotally connected by links 38 with mountings 39 fixed adjacent to the opposite ends of the tubes 37. And the nut 33 is pivotally connected by links 40 with mountings 41 fixed to the ends of the tubes or sleeve-bearings 37 adjacent to the mountings 39. Consequently, when the shaft 23 is rotated, the tubes 37 are moved toward or from the center line of the shaft 23 to define any one of several tubular or drum-like figures corresponding to the conduit to be cut. Each tube 37 contains a pin or rod 42 which is longitudinally adjustable therein and may be fixed in a desired longitudinal position by means of a chuck 43 rotated on the split end 44 of the tube 37. Each rod 42 has a marking prong 45 projected laterally therefrom and an outwardly bent end 46 tapering to a point in line with the prong 45 and equi-distant from the center line of the rod 42.

The base 4 may be provided with a bracket 47 containing a slot 48 in which a plate 49 may be clamped by the thumb nut 50 when the arm 10 is not in use.

When it is desired to lay out a pattern for a blank to be rolled into a collar for connecting a branch pipe with the curved wall of a main, the rod 13 is set at right angles to the rod 10, if the main be cylindrical, or if the main be tapered, the rod 13 is set with its edge at the same angle to the rod 10 that the wall of the main is inclined longitudinally relative to its axis. The rod 10 is adjusted in the housing 9 so that the distance from the axis of the housing trunnions to the edge of the rod 13 is the same as the radius of the main. The arms 8 are clamped in the pillars 6 to position the rod 10 at a convenient height for manipulation and the pillars 6 may have their base 5 adjusted along and clamped to the bar 3 so that the edge of the rod 13 will oscillate in a desired zone.

The shaft 23 is then rotated by means of the handle 34 to move the tubes 37 inward or outward until the distance between the points of the prongs 45 on diametrically opposite pins 42 is equal to the diameter of the branch pipe. The shaft 18 is adjusted vertically and rotatively relative to the hub 17 and the head 22 is rotatably adjusted relative to the shaft 18 so that the shaft 30 is directed or inclined toward the axis of the trunnions of the housing 9 at the same vertical and horizontal angles that it is desired that the axis of the branch pipe bear to the axis of the main pipe. The slide 15 is adjusted along the slideway until the edge of the rod 13 can be brought into contact with one of the points 46 on one of the rods 42. The arm 10 is then rocked on the axis of the trunnions of the housing 9 so as to generate an imaginary surface having a contour conforming with the contour of the main, and the rods or pins 42 are moved longitudinally in their bearings 37 until they respectively contact with the edge of the bar 13 in its various positions. That is to say, the points 46 of the bottom rod 42 will be drawn out until it contacts with the edge of the rod 13 when the latter is oscillated to a downward position; the point 46 of the next higher rod 42 will be drawn out until it contacts with the edge of the rod 13 when oscillated a short distance upward toward the horizontal; the point 46 of the next higher rod 42 will be drawn out until it contacts with the edge of the rod 13 when moved further toward the horizontal, and so on until each of the rods in sequence has been drawn out into a position for contacting with the imaginary surface described by the edge of the rod 13.

The pins 42 are secured in position by tightening up the chucks 43 as the points 46 are adjusted, and the end contour of a preformed pipe may be taken directly from such points. Preferably, however, the posts 21 are lifted from the sockets 20 and the cylindrical drum formed by the tubes 37 is rolled over a pattern sheet with the ends of the tubes parallel to the edge or a straight line thereon or forming a straight line thereon. The prongs 45 are pressed against or into the pattern sheet so as to mark the same at the points a, b, c, d, e, f, g, h, i, j, k, l thereon. By connecting these points, there is outlined on the pattern the shape required for cutting a flat sheet so that when it is rolled about a center line or axis to form a pipe section or collar the irregular edge thereof will conform with the contour of the surface of the main. The irregular end of the branch pipe section of the collar may be abutted against and secured around the edge of a properly shaped hole in the main as illustrated at m in FIG. 7, or the edge of the branch may be flanged over so as to bear against the surface of the main as indicated at n in FIG. 7.

If the main is tapered or conoidal, the rod 13 is set at the same angle to the rod 10 that the longitudinal surface of the main bears to the axis of the main. The oscillation of the rod 10 about the axis of the trunnions of the housing 9 will then describe a phantom contour conforming to the conoidal surface of the main, and by moving the points 46 outwardly in sequence into contact with the edge of the rod 13 in its different positions a pattern can be outlined by means of the marking points 45 which will provide the end contour necessary to give a neat fit of a branch pipe therewith.

When collar sections to form an elbow are to be laid out, the rod 10 may be fixed in a horizontal position and moved vertically by sliding the tube 8 in the pillar 6. The drum formed by the bearing tubes 37 is positioned at a desired vertical and horizontal angle relative to the plane along which the edge of the rod 13 passes, and by drawing out the points 46 into contact with the edge of the member 13 in the different vertical positions thereof, the marking points 45 are so arranged as to outline a pattern for an edge o of an elbow section such as shown in FIG. 8.

Instead of moving the rod 13 vertically to describe a phantom surface to which the ends 46 are moved, an actual surface may be provided by clamping the plate 49 in the bracket 47 and moving the points 46 outwardly against such surface.

By my improvements a series of indicia, preferably arranged annularly, may be positioned, by radial and longitudinal movement thereof, at spaced points of a tangible or intangible shape, form or contour preferably defined by the oscillatory or reciprocatory movements of a contour generating member. The indicia when so positioned are utilized to indicate the path along which to cut an edge design or pattern, either to form a template or to give the proper end formation to a conduit or the material from which a conduit is to be fashioned.

Hence a great variety of patterns may be made rapidly and economically to suit varying conditions, and the members forming the joints between the parts are cut accurately and without waste.

For increased accuracy, the cross bar 13 may be provided with a knife edge into which the pointed ends 46 are brought into engagement. Also, although the tubes 37 and rods 42 have been shown as circular in cross section, they could be made rectangular or of other shapes in cross section.

Having described my invention, I claim:

1. In apparatus for laying out a pattern, the combination of means comprising an oscillatory member for defining a contour, a plurality of indicia members arranged about a center and respectively movable longitudinally relative to one another and into juxtaposition with spaced points of said contour, and supports for said indicia members movable toward and from said center.

2. Apparatus of the character described comprising a fulcrumed device movable about an axis and having an edge movable through a part of the path equivalent to the path which would be occupied by the surface of a conduit section having an axis coincident with the axis of said device and a radius equal to the distance between the axis of the device and its edge, and means comprising a plurality of annularly arranged indicators movable toward and from the axis of the drum defined by said indicators and adjustable longitudinally to abut the path described by the edge of said device.

3. Apparatus of the character described comprising a head having journalled therein a shaft having reversely threaded sections, nuts threaded on said sections, bearings connected with and movable by said nuts parallel to said shaft, markers movable in said bearings, and a device for generating an imaginary path within the limits of movement of said markers.

4. Apparatus of the character described comprising a base, a carrier movable on said base, a standard comprising extensible sections supported by said carrier, a rocking member pivotally connected with said standard and rockable about an axis, said rocking member comprising a slide rod, and a bar pivotally connected with said slide and disposed transversely to the length thereof, in combination with a head movable about a vertical axis and a horizontal axis, a shaft journalled in said head and having threaded sections, nuts threaded on said shaft, links connected with said nuts, means forming slideways connected with said links, and slides longitudinally movable in said slideways and having thereon markers projecting laterally from the axes thereof, said markers being movable into abutment with said bar when said bar is rocked to describe an imaginary path equivalent to a part of the path which would be occupied by the surface of a conduit section having an axis coincident with the axis about which said bar is rockable.

5. In apparatus of the character described comprising a base member, a carriage movable relatively to said base member, an extensible support carried by said carriage, a rod, means whereby said rod is fulcrumed on said support, said rod being longitudinally movable relatively to said support, a contour generating member carried by and extending transversely to said rod and movable relatively thereto, a second base member disposed transversely to said first named base member, a carriage movable relatively to said second base member, a support carried by said second carriage and movable rotatably and longitudinally relative thereto, a threaded shaft connected with said last named support, nuts threaded on said shaft and movable by the rotation thereof, means including a plurality of bearings carried by said nuts and movable toward and from said shaft by the rotation thereof, and indicia members longitudinally movable in the respective bearings into juxtaposition to said contour generating member in the different positions thereof.

6. Apparatus of the character described comprising means including a fulcrumed straight-edge element and a guide for said element whereby the radius of said straight edge from the fulcrum may be varied, and adjacent means including a plurality of markers defining a drum and respectively movable longitudinally of the drum into contact with said straight edge when the latter is fulcrumed to different positions and means including a threaded member associated with said markers by which said markers may be moved toward and from the axis of the drum defined by said markers.

7. Apparatus of the character described comprising a fulcrumed device movable about an axis for defining a path equivalent to the path which would be occupied by the surface of a conduit section having an axis coincident with the axis of said device, said fulcrumed device including a pivotal member for defining said path, said pivotal member being capable of disposition oblique to the axis about which said device moves, and means comprising a plurality of annularly arranged indicators movable toward and from the axis of the drum defined by said indicators and adjustable longitudinally to abut the path described by said pivotal member.

8. A device for facilitating the jointure of conduits comprising a series of annularly arranged indicia members movable longitudinally and radially, and means for generating a contour which simulates a part of the contour of a conduit, said means including a rod adjustable to a radius equivalent to a radius of the simulated conduit, said members being movable into contact with said means for generating said contour at a zone equivalent to the surface of the simulated conduit contour.

References Cited in the file of this patent

UNITED STATES PATENTS

| | | |
|---|---|---|
| 397,132 | Kimball | Feb. 5, 1889 |
| 1,745,156 | Fantz | Jan. 28, 1930 |
| 2,466,464 | Moore | Apr. 5, 1949 |
| 2,501,893 | Dudley | Mar. 28, 1950 |
| 2,725,776 | Hopkins | Dec. 6, 1955 |

FOREIGN PATENTS

| | | |
|---|---|---|
| 805,314 | Germany | May 15, 1951 |